United States Patent
Gehling

(10) Patent No.: US 6,186,125 B1
(45) Date of Patent: Feb. 13, 2001

(54) CONTROL DEVICE FOR A DIESEL-OPERATED INTERNAL-COMBUSTION ENGINE AND OIL-HEATING SYSTEM

(76) Inventor: Johannes Gehling, Laurastrasse 24a, D-45289 Essen (DE)

( * ) Notice: Under 35 U.S.C. 154(b), the term of this patent shall be extended for 0 days.

(21) Appl. No.: 09/043,223
(22) PCT Filed: Sep. 18, 1996
(86) PCT No.: PCT/EP96/04084
§ 371 Date: Mar. 11, 1998
§ 102(e) Date: Mar. 11, 1998
(87) PCT Pub. No.: WO97/11268
PCT Pub. Date: Mar. 27, 1997

(30) Foreign Application Priority Data

Sep. 20, 1995 (DE) .......................... 295 14 973 U

(51) Int. Cl.[7] .................................................. F02G 5/00
(52) U.S. Cl. ............................................................ 123/556
(58) Field of Search ................................................ 123/556

(56) References Cited

U.S. PATENT DOCUMENTS

| | | | |
|---|---|---|---|
| 1,489,004 | | 4/1924 | Powell . |
| 2,833,261 | * | 5/1958 | August .................................. 123/556 |
| 3,859,971 | * | 1/1975 | Rauen .................................... 123/556 |
| 4,005,693 | * | 2/1977 | Masaki et al. ........................ 123/556 |
| 4,089,214 | * | 5/1978 | Egami et al. ......................... 123/556 |
| 4,367,700 | * | 1/1983 | Pace ...................................... 123/556 |
| 4,426,972 | * | 1/1984 | Kimura et al. ....................... 123/556 |
| 4,463,721 | * | 8/1984 | Hayashi et al. ...................... 123/556 |
| 4,881,507 | * | 11/1989 | San Filipo ............................ 123/556 |
| 5,213,086 | * | 5/1993 | Sims ..................................... 123/556 |

FOREIGN PATENT DOCUMENTS

| | | |
|---|---|---|
| 31 38 415 | 5/1983 | (DE) . |
| 611 914 | 10/1926 | (FR) . |
| WO 92/09803 | 6/1992 | (WO) . |

* cited by examiner

Primary Examiner—John Kwon
(74) Attorney, Agent, or Firm—Herbert Dubno

(57) ABSTRACT

A control system for a diesel-operating internal combustion engine has in a cast-plastic housing heater connected to the air supply line and upstream of an air mixer and an adjusting device in the diesel fuel line leading to the mixer. A limiter is provided between an air control device in the air supply line and the mixer can include a cylindrical gate around which the air is guided and an air control plunger at the upstream end of that body.

10 Claims, 3 Drawing Sheets

CONTROL DEVICE FOR A DIESEL-OPERATED INTERNAL-COMBUSTION ENGINE AND OIL-HEATING SYSTEM

CROSS REFERENCE TO RELATED APPLICATION

This application is a national stage of PCT/EP96/04084 filed Sep. 16, 1996 and based upon German national application 295 14 973.6 filed Sep. 20, 1995 under the International Convention.

FIELD OF THE INVENTION

The invention relates to a control device for a diesel-operated internal-combustion engine, or for an oil-heating system, with a mixer unit, wherein diesel oil and air can be mixed to form a fuel mixture, a diesel oil feed line, by means of which the diesel oil can be fed to the mixer unit, an air feed line by means of which the air can be fed to the mixer unit, a fuel mixture line by means of which the fuel mixture can be introduced from the mixer unit into the internal-combustion engine, or the oil-heating system, and a setting device by means of which the diesel oil flow through the diesel oil feed line can be adjusted.

BACKGROUND OF THE INVENTION

When diesel-operated internal-combustion engines and oil-heating systems are used, very often the energy content of the diesel oil is not optimally used for the production of mechanical or thermal energy. As a result, the fuel consumption can be too high, whereby in addition a greater amount of pollutants can be emitted because of the incomplete combustion of the diesel oil.

OBJECT OF THE INVENTION

It is the object of the invention to provide a control device for a diesel-operated internal combustion engine, or for an oil-heating system, which can reduce on the one hand the fuel consumption and on the other hand the pollutant emissions by optimizing the combustion process.

SUMMARY OF THE INVENTION

According to the invention, this object is achieved through a control device for a diesel-operated internal-combustion engine, which in addition to the features mentioned in the introduction has a heater by means of which the air flowing through the air feed line can be dehumidified and heated to an approximately uniform temperature, a control unit arranged in the air feed line downstream of the heater by means of which the air flow through the air feed line can be controlled depending on the speed of the internal-combustion engine, and a limiter unit which is arranged in the air feed line downstream of the control unit and by means of which the maximal amount of air flowing through the air feed line can be predetermined.

For an oil-heating system this object is achieved by means of a control unit which, in addition to the features described in the introduction, also comprises the above-mentioned heater, as well as the above-mentioned limiter unit.

In an embodiment of the control device according to the invention wherein the mixer unit has an air-guiding cylinder arranged approximately perpendicularly with respect to the flow direction of the diesel oil feed line and along whose peripheral surface the air enters the diesel oil flow passing through the mixer unit, the control unit can be replaced by a control plunger which is mounted to be axially slidable at the front end of the air-guiding cylinder remote from the diesel oil flow. Due to the possibility of axial displacement of the control plunger, the amount of air entering the annular space surrounding the air-guiding cylinder, and thereby entering the diesel oil flow, can be controlled.

Depending on the diesel oil aggregate, by using such control devices fuel savings of at least 10% result, whereby in most cases they clearly exceed 10%. The control device of the invention can be used in a simple manner and universally for retrofitting of stationary and mobile installations, particularly trucks, busses, passenger automobiles, construction and agricultural machines, propulsion and supply aggregates, ships, motorboats, etc.

The control unit by means of which the air flow through the air feed line can be controlled depending on the speed of the internal-combustion engine can have a particularly advantageous construction when the control unit has an electronic control, wherein voltage differences occurring in a generator as a result of changes in the speed of the internal-combustion engine are converted by electronic components into signals, by means of which a drive unit for controlling means or a valve for controlling the flow is actuated. Due to this control of the amount of admixed air depending on the speed of the internal-combustion engine, the combustion of the diesel oil/air mixture is considerably improved. The electronic components of the electronic controller can also be integrated into an electronic module built for this purpose.

The maximum air flow through the air feed line can be set in a particularly simple manner when the limiter unit is an adjusting needle. By combining the action of this needle, by means of which the flow cross section of the air feed line can be limited, and of the underpressure produced by the diesel oil flow passing through the mixer unit, the maximum amount of the air to be supplied through the air feed line to the mixer unit results.

When used in connection with diesel-operated internal-combustion engines, it has been proven that the most advantageous location for the control device of the invention is upstream of the injection pump of the diesel-operated internal-combustion engine.

When the control device of the invention is used in connection with an oil-heating system, the location should be upstream of an oil filter of the oil-heating system.

The air can be introduced into the mixer unit through the air feed line in a particularly advantageous manner when the air is sucked into the mixer unit by means of the suction pressure of the diesel oil flowing through the mixer unit. Furthermore due to the increase of the suction pressure with the increasing diesel oil flow a quantitative adjustment of the air amount aspired from the air feed line into the mixer unit to the amount of diesel oil flowing through the mixer unit results.

For the protection of the heater, the control unit and the limiter unit against overload it is advantageous to insert an oil filter in the air feed line.

The heater can be advantageously designed as an electric heating element.

A high-grade glass-fiber reinforced plastic material has proven to be especially suitable for the housing of the control device of the invention, whereby preferably Technyl A 20 V 25 can as such a material.

A simple way of manufacturing the control device of the invention is achieved when the electronic components and the heater are cast with the housing.

In the control device of the invention a check valve is arranged in the air feed line upstream or in the area of the heater, which closes when air is no longer aspired through the air feed line. This reliably prevents when the engine is turned off, the diesel oil from escaping from the control i device of the invention through the air feed line.

In specific cases of use, e.g. gasoline engines, wherein fuel pumps are arranged in the fuel feed line upstream of the mixer unit, when the fuel feed line can be provided with transverse opening only at the downstream radial end segment of the air-guiding cylinder, in the flow direction of the fuel, through which opening the air flowing along the peripheral surface of the air-guiding cylinder can be sucked into the fuel flow. Since otherwise the annular space surrounding the air-guiding cylinder is sealed against the fuel feed line, this reliably prevented this way that the fuel entering the mixer unit under pressure as a result of the action of the fuel pumps travels upwards on the peripheral surface of the air-guiding cylinder.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
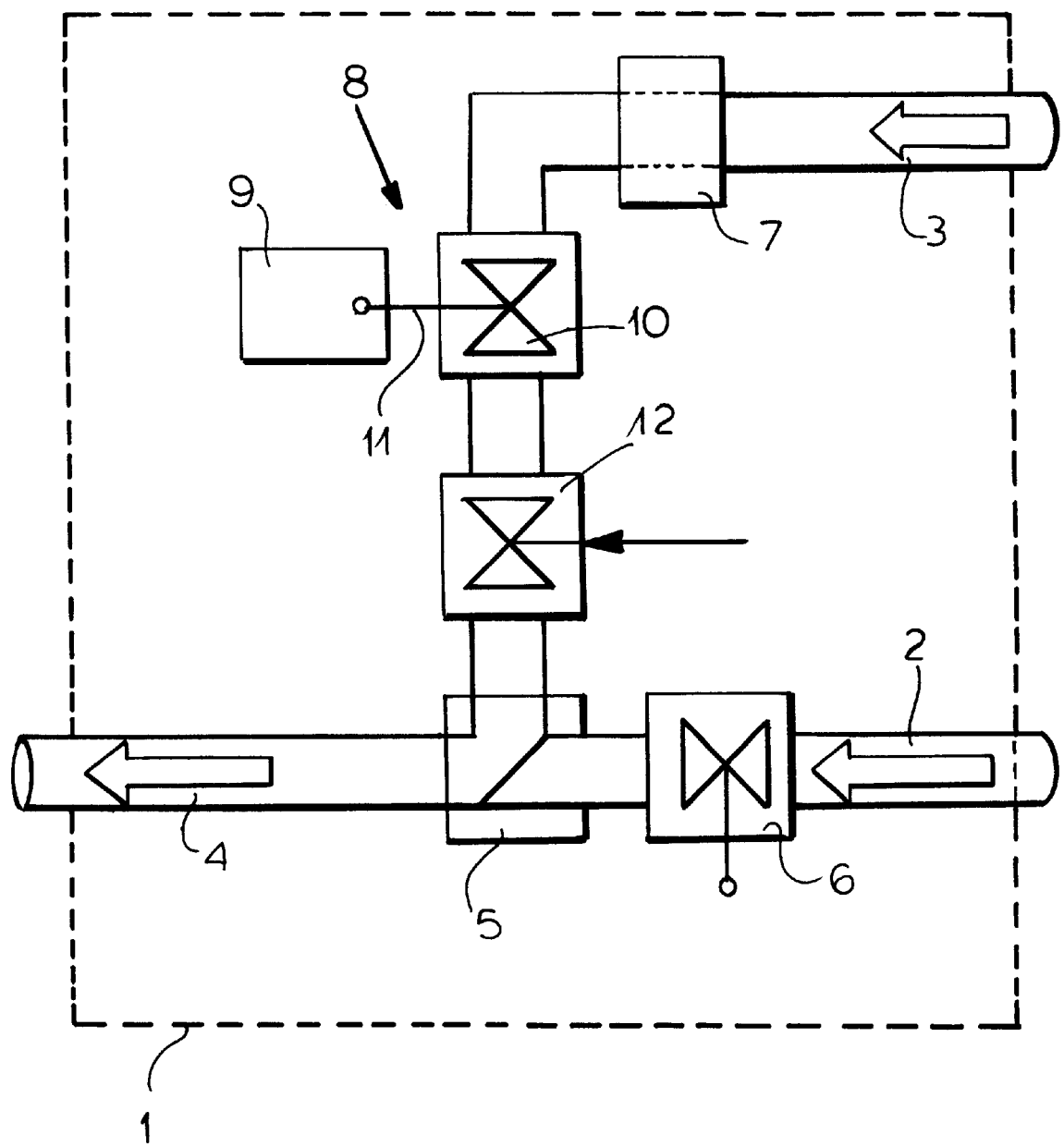
FIG. 1 is a flow diagram of an embodiment of the control device of the invention suited for diesel-operated internal-combustion engines.

A control device according to the invention shown in principle in FIG. 1 has a housing 1, into which extend a diesel oil feed line 2 and an air feed line 3 and from which exits a fuel mixture line 4. This housing is arranged upstream of a fuel pump of the diesel-operated internal-combustion engine.

Within the housing 1 there is a mixer unit 5 supplied with diesel oil through the diesel oil feed line 2 there is and with air through the air feed line 3 and wherein the diesel oil and the air can be mixed. The mixer unit is built so that as a result of the suction pressure which prevails at the connection point not shown in the Figure, of the mixer 5 unit to the air feed line 3 and which is produced by the diesel oil flow passing through the mixer 5, air is aspired into the mixer unit 5 through the air feed line 3.

In the diesel oil feed line 2 an adjusting device 6, by means of which the flow of the diesel oil through the diesel oil feed line, and therewith through the mixer unit 5 can be adjusted. This adjusts also the underpressure sucking the air from the air feed line 3 into the mixer unit 5.

At the incoming side of the air feed line 3 there is a heater 7, which advantageously is an electric heating element and by means of which the air entering the air feed line 3 is on the one hand dehumidified, and on the other hand brought to a uniform temperature.

A control unit 8 with an electronic control 9 and a controller, or valve 10, is arranged in the air feed line downstream of the heater 7.

In the electronic control 9 voltage changes occurring in a generator due to the changes in the speed of the internal-combustion engine are transformed into signals, by means of which a setting device 11 is actuated to influence the valve or controller 10 to adjust the flow cross section of the air feed line 3. Therefore an increase in the speed of the internal combustion engine leads to an approximately proportional increase of the flow cross section of the air feed line 3, and thereby to an increase of the air supply to the mixer unit 5.

In the air feed line 3, downstream of the control unit 8 and upstream of the mixer unit 5, there is a limiter unit 12 which can set the maximum amount of air which can be sucked into the mixer unit 5 at a specific suction, or underpressure produced by the throughflow of the diesel oil.

The housing 1 consists, as already mentioned, of a high-grade glass-fiber reinforced plastic material, for instance Technyl A 20 V 25. This material is characterized by a high rigidity, a high thermal stability and is highly nonflammable. The housing as well as the components it comprises is almost completely maintenance free, resistant to impact, break resistant, shockproof and not sensitive to temperature. A 12 V/24 V/42 V direct current or a 230 V alternating current can be used for supplying the electronic control.

Variations in the voltage supply network caused by changes in the speed of the internal-combustion engine, preferably in a generator of a motor vehicle, are detected by the electronic control and influence directly the air admixture in the mixer unit 5 by means of the adjusting device 11 of the control unit 8. Thereby it is insured that the diesel-operated aggregate in a wide work range is always supplied with the optimal fuel/air mixture.

Figure 2:
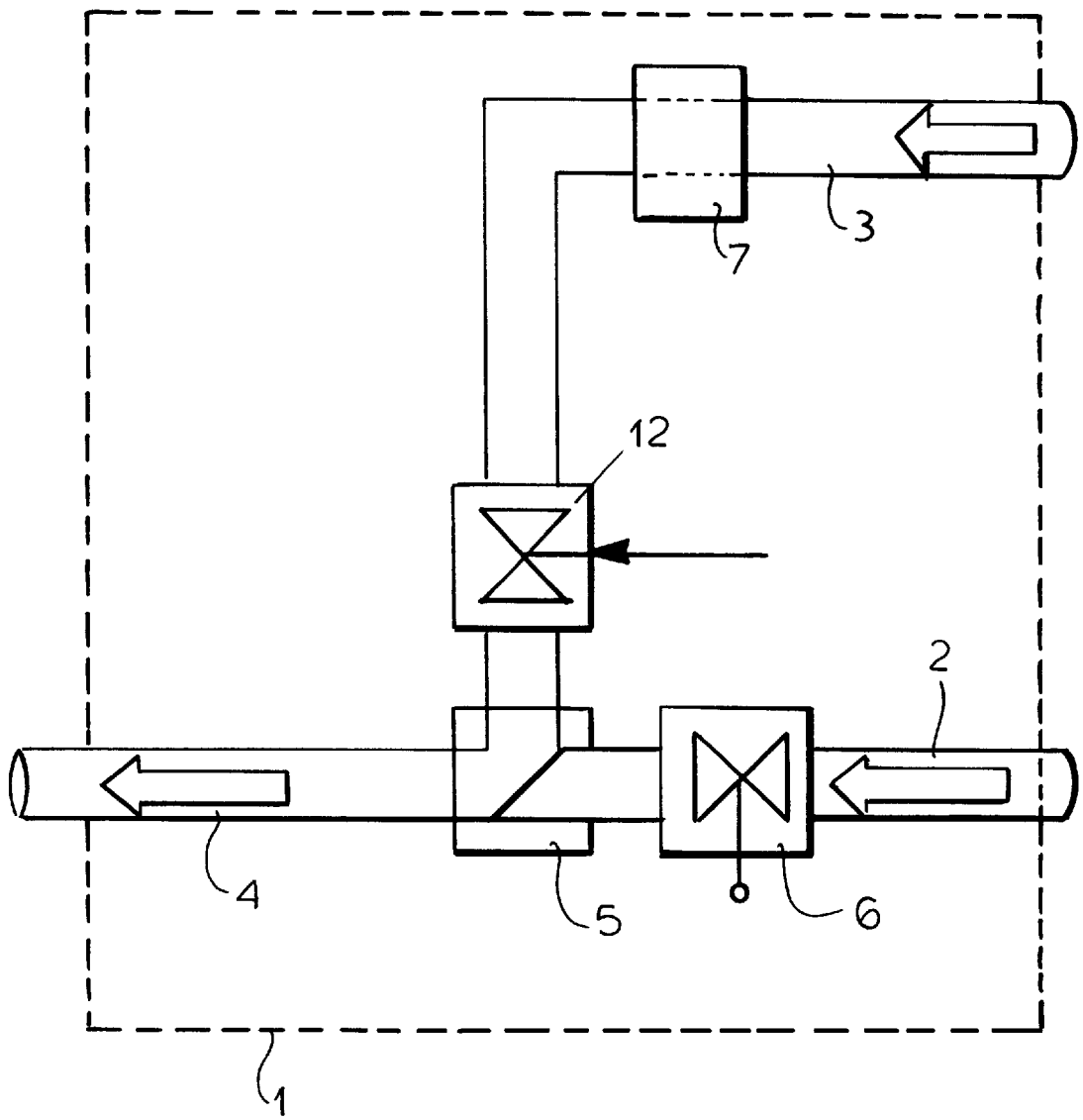
FIG. 2 is a flow diagram of an embodiment of the control device of the invention suited for an oil-heating system.

A control device for an oil-heating system as represented in FIG. 2 differs from the control device previously described in connection with FIG. 1 in that, on the one hand the fuel mixture line 4 leads not to a diesel-operated internal-combustion engine, but to the combustion chamber of an oil-heating system, so that in this case the control device is arranged in front of an oil filter of the oil-heating system, and on the other hand in that the control device provided for the oil-heating system does not have a control unit 8, by means of which the voltage variations due to changes in the speed of the internal-combustion engine are taken into consideration. Such considerations are of course not necessary in the case of an oil-heating system, since after setting the adjusting device 6, the quantity of the diesel oil flowing through the mixer unit 5 is firmly established. By means of the limiter unit 12, which can be an adjusting needle or the like, it is insured that a predetermined maximum air amount which can enter the mixer unit 5 is not exceeded.

Figure 3:
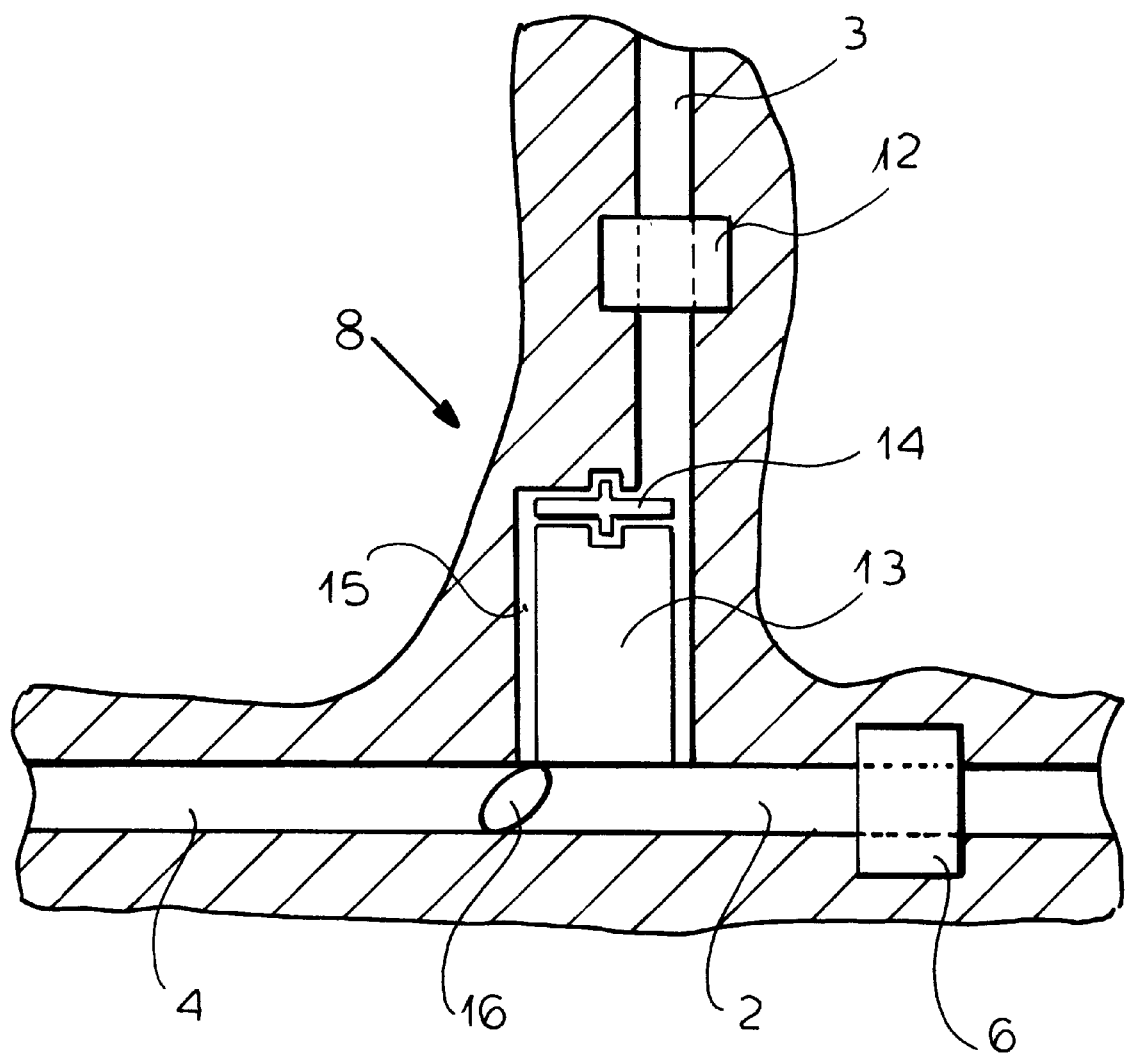
FIG. 3 is a flow diagram of a further embodiment of the control device of the invention in the area of the mixer unit.

To the extent that the mixer unit 5 of the control device of the invention is built as shown in FIG. 3, the comparatively expensive control unit 8 can be eliminated.

In the embodiment represented in FIG. 3, the mixer unit 5 arranged downstream of the limiter unit 12 in the air feed line 3, has an air-guiding cylinder 13 along whose peripheral surface an annular space is formed, through which the air is sucked into the diesel oil or fuel flow which comes from the fuel feed line 2 and passes through the mixer unit 5.

At the transition between the air feed line 3 and the annular space 15 formed by the air-guiding cylinder 13, on the end of the air-guiding cylinder 13 which is removed from the fuel flow, a control plunger 14 is supported so as to be axially movable. By means of this control plunger 14 the amount of air entering the annular space 15 from the air feed line 3 can be adjusted.

When, as seen in FIG. 3, the fuel feed line opens only at the rear end segment of the air-guiding cylinder 13, seen in the flow direction of the fuel, namely as shown in FIG. 3 through the transverse opening 16, the rise of the fuel through the annular space 15 surrounding the air-guiding cylinder 13 and its escape into the air feed line 3 are reliably prevented.

With this embodiment wherein the air feed line has its transverse opening 16 at the rear end segment of the air-guiding cylinder, seen in the direction of the fuel flow, the control device of the invention can also be used in gasoline-run engines, wherein the fuel pumps are arranged upstream of the mixer unit 5.

What is claimed is:

1. A control system for a diesel internal combustion engine, comprising:
    a diesel fuel line for a diesel internal combustion engine;
    a cylindrical mixing chamber having an open end opening perpendicularly and vertically into said diesel fuel line and formed with a cylindrical wall extending to said open end;
    a cylindrical air-guiding body in said chamber, surrounded by said wall and having one end of said body turned toward said diesel fuel line and another end of said body turned away from said diesel fuel line, said body having a cylindrical wall between the ends of said body defining an annular air-flow gap with said cylindrical wall of said mixing chamber;
    an air supply line communicating with said chamber at an end thereof opposite said open end of said chamber and containing:
        a heater for dehumidifying air fed to said mixing chamber heating the air to a uniform temperature, and
        a limiter in said air supply line downstream of said heater and upstream of said mixing chamber for establishing a maximum air flow from said air supply line to said mixing chamber;
    a plunger on said other end of said body axially movable in said mixing chamber and controlling flow of said air between said walls to said diesel fuel line.

2. The control system defined in claim 1, further comprising a control unit between said heater and said limiter and having an electronic control wherein voltage differences based on changes in engine speed occurring in a generator are converted into signals by means of which a control valve of the control of the control unit is actuated for controlling a throughflow of said air supply line.

3. The control system defined in claim 1 wherein the air is sucked into the mixing chamber by means of a suction pressure of diesel oil flow through said diesel fuel line.

4. The control system defined in claim 1 wherein said heater is an electric heating element.

5. The control system defined in claim 1 wherein a check valve is arranged in the air supply line at the heater.

6. A control system for a diesel internal combustion engine, comprising:
    a diesel fuel line for a diesel internal combustion engine;
    a cylindrical mixing chamber having an open end opening perpendicularly and vertically into said diesel fuel line and formed with a cylindrical wall extending to said open end;
    a cylindrical air-guiding body in said chamber, surrounded by said wall and having one end of said body turned toward said diesel fuel line and another end of said body turned away from said diesel fuel line, said body having a cylindrical wall between the ends of said body defining an annular air-flow gap with said cylindrical wall of said mixing chamber;
    an air supply line communicating with said chamber at an end thereof opposite said open end of said chamber and containing:
        a heater for dehumidifying air fed to said mixing chamber heating the air to a uniform temperature, and
        a limiter in said air supply line downstream of said heater and upstream of said mixing chamber for establishing a maximum air flow from said air supply line to said mixing chamber.

7. The control system defined in claim 6, further comprising a control unit between said heater and said limiter and having an electronic control wherein voltage differences based on changes in engine speed occurring in a generator are converted into signals by means of which a control valve of the control of the control unit is actuated for controlling a throughflow of said air supply line.

8. The control system defined in claim 6 wherein the air is sucked into the mixing chamber by means of a suction pressure of diesel oil flow through said diesel fuel line.

9. The control system defined in claim 6 wherein said heater is an electric heating element.

10. The control system defined in claim 6 wherein a check valve is arranged in the air supply line at the heater.

\* \* \* \* \*